Sept. 15, 1964

E. J. GERRITY 3,148,760

TRANSFER MECHANISM

Filed Oct. 25, 1961

INVENTOR
Edward J. Gerrity

By *William J. Newman*
Attorney 3,148,760
TRANSFER MECHANISM
Edward J. Gerrity, Wood Dale, Ill., assignor to Stewart-Warner Corporation, Chicago, Ill., a corporation of Virginia
Filed Oct. 25, 1961, Ser. No. 147,652
8 Claims. (Cl. 198—24)

This invention relates to high speed conveyors, and more particularly to an improved transfer mechanism for such conveyors.

The rapid development in automation of manufacturing processes carried on in large industrial plants, has resulted in a definite need for high speed conveying systems for moving various objects such as articles or packages rapidly from one area to another. Since such conveyor systems generally employ a number of moving conveyor belts or other apparatus which may have intersections, as well as a number of loading and discharge stations, there is the further requirement of a transfer mechanism which operates at extremely high speed to accurately load and discharge the package to and from the conveyor.

The problem becomes even more complex when there is a lack of uniformity in the physical dimensions of the package or other object being carried by the conveyor system. In providing some means for removing the package from the conveyor, the transfer means should contact the element or package at the center, or along a series of contact points on the package, such that even pressure is exerted on the package for moving it accurately along a given line, this line generally being perpendicular to the direction of movement of the package along the conveyor belt.

With present day conveying systems having belts, or the like, operating at lineal speeds at 300 ft. per minute or more, it can be appreciated where a package must be removed from the surface of the conveyor and transferred to another conveyor or to a receiving station. The transfer mechanism must also move at an extremely high speed in order to insure that the package is removed at the required station.

Previously, transfer mechanisms have, for the most part, been operated by mechanical linkages connecting them to electric motors, or the like. An example of such a system may be seen in the copending application of Warren E. Graybeal, Serial No. 18,614, filed March 30, 1960, now Patent No. 3,045,801, issued July 24, 1962. It was found, however, that the mechanically operated systems are quite costly, especially when extremely high speed and accuracy requirements must be met.

Applicant has found that transfer mechanisms may be operated much more efficiently and economically by pneumatic means, especially where large and/or varied size objects are to be transferred onto, or off of high speed conveyor systems. Expensive, large electric or other type motors are unnecessary, as are cumbersome mechanical linkages. A simple air cylinder and piston arrangement may be used with a simple and direct mechanical coupling to impart motion to the paddle member of the transfer mechanism.

Air operated systems also provide flexibility in the control of speed and force of operation which is not found in most motor driven transfer mechanisms. For example, in the mechanism of the above identified Graybeal application, the speed and force of movement of the paddle member is dictated by the particular motor selected and the mechanical advantages of the linkages between the motor and the transfer mechanism. The speed and force of the forward stroke are identical to the speed and force of the return stroke and cannot be readily altered.

Air operated systems do present some problems, however, which must be overcome. Provisions must be made to accurately and reliably program the air supply to provide a driving force in the forward direction and, subsequently, in the opposite direction to return the paddle member to its home position. Adequate provisions for braking of the paddle member as it approaches its extreme positions are necessary as well as controls for manipulating the force and speed of operation individually for the forward and return strokes.

It is also desirable that spurious operation of the transfer mechanism be prevented. Being associated with moving conveyor systems, or the like, vibrations and shocks are expectedly encountered which could trigger the false operation of a transfer system.

It is therefore an object of this invention to provide a transfer mechanism for a high speed conveyor system wherein objects may be accurately removed at high speeds, regardless of the size of the objects (within predetermined limits), the high speed transfer mechanism allowing relatively close spacing of the object upon the conveyor belt.

It is also an object of this invention to provide an air operated transfer mechanism for a high speed conveyor system wherein maximum speed and flexibility are available while materially reducing cost over other type systems.

A further object of this invention is to provide an air operated transfer mechanism which is accurately and reliably controlled by means of its own motion.

A still further object of this invention is to provide means for preventing the spurious operation of an air operated transfer mechanism which might result from unavoidable vibrations and shocks.

Other objects of this invention will be pointed out in the following detailed description and claims, and illustrated in the accompanying drawings which disclose by way of example the principles of this invention and the best mode which has been contemplated of applying those principles.

In general the present invention comprises a transfer mechanism for a high speed conveyor system employing a horizontally moving conveyor belt. The transfer mechanism includes a paddle member and means mounting the paddle member for movement transversely of the conveyor. An air cylinder having a piston therewithin operatively connected to the paddle member provides the motive force for the paddle member. Each end of the cylinder is connected through separately controllable means to an air source each of which include an electrically operable valve. Relay means, or the like, which are operable responsive to an electrical signal indicating the approach of a package to be discharged at the particular station, are provided for energizing one of the valves to move the paddle member towards its extended position. The arrival of the paddle member at or near its extended position causes a switch to be activated which deactivates the first valve and activates the other valve so as to reverse the movement of the paddle member. As the paddle member approaches its home position, the second valve is deenergized to cause the paddle to stop and when it reaches its home position the second valve is again activated so that air in the other end of the cylinder will hold the paddle member in its home position thus preventing spurious operation of the transfer mechanism.

Figure 1:
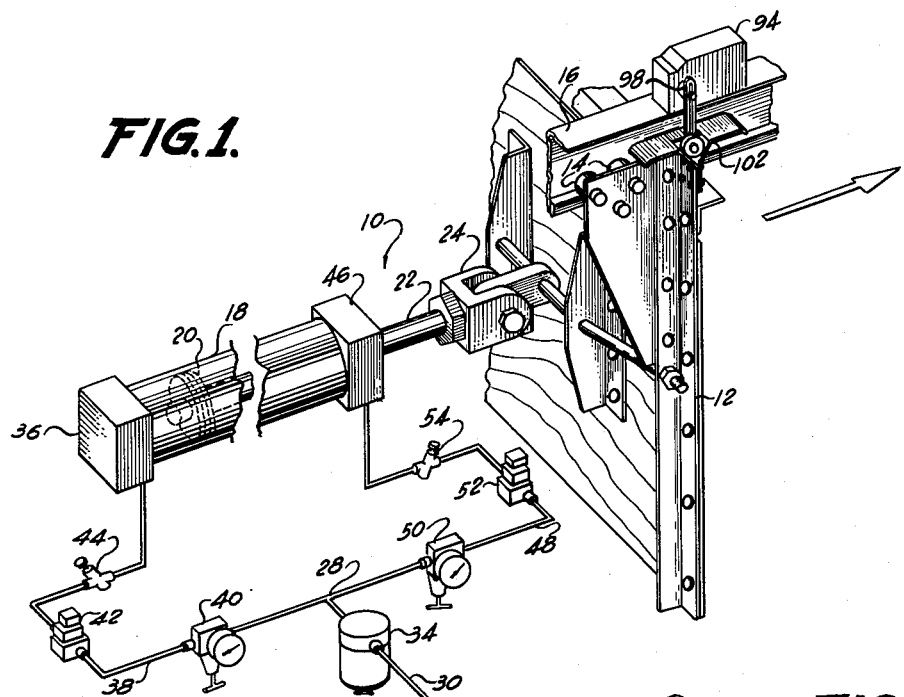
FIG. 1 is an isometric view of an air operated transfer mechanism embodying the inventive concepts of this invention.

Referring now to FIG. 1, there is shown a transfer mechanism 10 comprising a paddle member 12 having rollers 14 which engage a track member 16 which extends above and transversely to the conveyor belt (not shown). It is to be understood that other means for supporting and guiding the paddle member 12 may be employed and that the representations herein made are for the purpose of showing a preferred embodiment of the invention.

An air cylinder 18 having a piston 20 therewithin is mounted behind the paddle member 12. The piston 20 has connected thereto a shaft 22 which is operatively coupled to the paddle member 12 by any convenient means such as clevis joint 24. If desired appropriate shock absorber means may be provided in the connection between the shaft 22 and the paddle member 12.

The air cylinder 20 is supplied at either end from a pressurized air source 26. The air source 26 is connected to a junction 28 through a line 30 including a manual shutoff valve 32 and an air line lubricator 34 of any well known type. The forward stroke end 36 of the cylinder 20 is connected to the junction 28 through a line 38 including a pressure regulator and gauge unit 40, a solenoid operated valve 42, and a speed control valve 44. The return stroke end 46 of the cylinder 20 is connected to the junction 28 by means of a line 48 including a pressure regulator and gauge 50, a solenoid operated valve 52, and a speed control valve 54.

Individual speed controls 44 and 54, as well as pressure regulators 40 and 50 in the lines to the forward stroke and return stroke ends of the cylinder provide maximum flexibility in regulating the operation of the transfer mechanism. For example, it may be desirable in many applications, such as when heavy packages are to be encountered, that the return stroke be faster than the forward stroke and that the forward stroke be stronger than the return stroke. In other applications in which small packages of nearly uniform weight are to be encountered, it may be desirable that the forward and return strokes be equal. If the latter case is contemplated, there may be a substantial savings if only one pressure regulator and one speed control valve are utilized in the line 30 leading directly between the pressurized air source 26 and the junction 28. In any event, it is desirable that the pressure regulators and the speed control valves be of the locking type so that they may be set after the desired operating conditions have been found.

Figure 2:
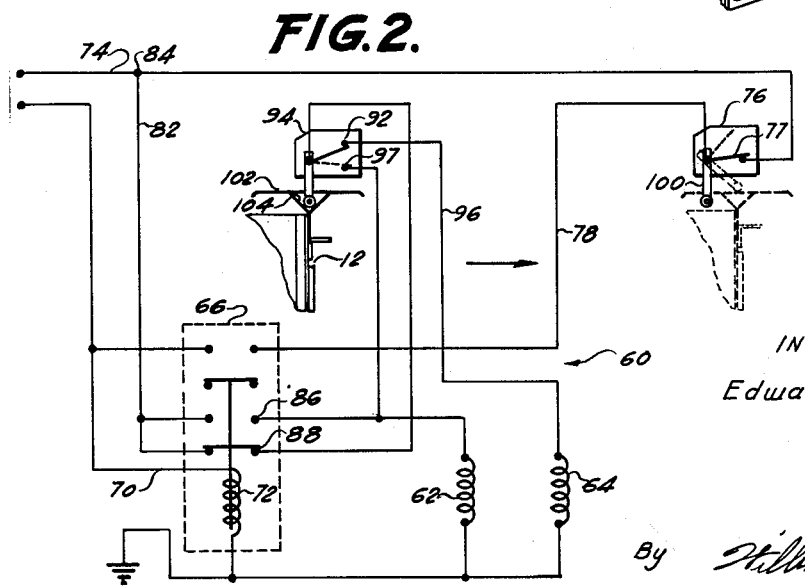
FIG. 2 is a schematic of the electrical control circuits for operating the transfer mechanism of FIG. 1.

Referring now to FIG. 2, there is shown the control circuit 60 for electrically programming the operation of the solenoid operated air valves 42 and 52 to drive the transfer mechanism. The coils 62 and 64 shown in the diagram represent the solenoids for the forward stroke valve 42 and the return stroke valve 52, respectively.

A control relay 66 governs the initiation of the operation of the transfer mechanism when a signal is received over line 70 to energize the relay coil 72 over an obvious circuit to ground. The signal line 70 may be connected to the output of any well known type decoder unit used in conveyor systems for determining the approach of an object which is addressed to be transferred by the particular transfer mechanism.

When the relay 66 pulls in, it completes a holding circuit from a power source comprising line 74, make contacts 77 on an extended position limit switch 76, line 78, make contacts 80 of relay 66, line 70 and relay coil 72 to ground. Relay 66 also completes a circuit to the coil 62 of the forward-stroke solenoid operated valve 42 by means of a circuit including line 82 connected at junction 84 to line 74, make contacts 86 of relay 66 and forward stroke solenoid air valve coil 62 to ground.

The coil 64 for the return stroke air valve 52 is energized only when the control relay 66 is in its unenergized condition by means of a circuit including line 82, break contacts 88 of relay 66, line 90, break contacts 92 on a home position limit switch 94, line 96 and return stroke air valve coil 64 to ground. It may thus be seen that air is supplied to the return stroke end 46 of the cylinder 18 whenever the control relay 66 is in its deenergized condition and the home position limit switch 44 is in its non-operated position. Since this condition exists whenever the transfer mechanism is at rest and no signal has been applied to line 70, the paddle member 12 is being held in its home position by means of the pressurized air supplied to the return stroke end of the cylinder.

Make contacts 97 are also provided on the home position limit switch 94. The circuit to the return stroke valve 64 is broken by these contacts as the paddle member approaches its home position from its extended position.

The home position limit switch 94 and the extended position limit switch 76 are positioned to define the distance of traversal of the paddle member 12 across the conveyor. They may be of any well known type having actuator arms 98 and 100, respectively, which are engageable by an actuator member 102 adapted to travel with the paddle member 12.

The actuator member 102 is of special design so that the actuator arm 98 of the home position limit switch 94 will dwell in a recessed portion 104 when the paddle member 12 is in its home position, but the actuator arm 100 on the extended position limit switch 76 will not at any time drop into the recessed portion 104. This permits the home position limit switch 94 to assume its non-operated position when the paddle member 12 is in its home position to complete the circuit through the coil 64 for the return stroke air valve 52 to provide the holding force on the paddle member in its home position.

Figure 3:
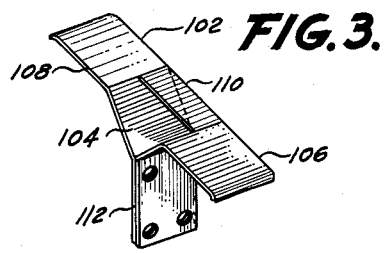
FIG. 3 is an enlarged isometric detail of the limit switch actuator.

As shown in FIG. 3 the actuator 102 comprises a forward extending plate portion 106 and a rearward extending plate portion 108 between which is a recessed portion 104. A third plate portion 110 is coplanar with and interconnects the two portions 102 and 106 over a part of the recessed portion 104 so as to provide a smooth track for the extended position limit switch actuator arm 100. A support portion 112 is adapted to rigidly connect the actuator member 102 to the paddle member 12 in a manner so that the actuator arm 98 of the home position limit switch 94 will dwell in the recessed portion 104 but the actuator arm 100 of the extended position limit switch 76 will ride over the plate portion 110 extending across the recessed portion 104.

A description of the operation of the pneumatic transfer mechanism will now be made with special reference to the schematic diagram of FIG. 2. Assuming first that the mechanism is in its at rest position, the relay 66 is in its deenergized position, the paddle member 12 is at its home position so that the actuator arm 98 of the home position limit switch 94 dwells in the recess portion 104 of the actuator member 102. The circuit is thereby completed for the coil 64 for the return stroke solenoid air valve 52 through the circuit previously described to apply air pressure to the return stroke end 46 of the cylinder 18 thereby holding the paddle member in its home position and preventing spurious operations of the mechanisms.

A signal received on line 70 to indicate the approach of a package to be transferred by the transfer mechanism energizes the coil 72 of the control relay 66. When the relay pulls in, it locks itself as previously described, breaks the circuit at break contacts 88 to the return stroke air valve coil 64 releasing the pneumatic hold of the paddle member, and completes the circuit through make contacts 86 to the coil 62 for the forward stroke air valve 42. Air enters the forward stroke end 36 of the cylinder 18 through the circuit from the pressurized air source 26 including the manual valve 32, lubricator 34, junction 28, pressure regulator and gauge 40, solenoid operated air valve 42 and speed control valve 44 to force the piston 20 and hence the paddle member 12 toward their extended positions. As the paddle member 12 approaches its extended position, the leading edge of the actuator member 102 engages the actuator arm 100 of the extended position limit switch 76 so as to open break contacts 77.

As soon as the contacts 77 are opened the hold circuit for the relay 66 is broken and the relay falls back to its non-operated position shown in FIG. 2. The circuit to the coil 62 of the forward stroke air valve 42 is broken at make contacts 86 and the circuit for the coil 64 of the return stroke air valve 52 is again established through the break contacts 88. Pressurized air is again introduced into the return stroke end 46 of the cylinder 18 to brake the forward motion of the piston 20 and as the paddle member 12 approaches the position shown in phantom in FIG. 2, its motion will be reversed toward its home position. As previously described, the actuator arm rides over the plate portion 110 extending across the recessed portion 104 of the actuator member 102 in order to provide sufficient time for the relay 66 to drop out.

As the paddle member 12 approaches its home position on its return stroke, the rearward edge of the rearward portion 108 of the actuator member engages the actuator arm 98 of the home position limit switch 94. When the limit switch 94 is actuated, the break contacts 92 open the previously described circuit for the coil 64 of the return stroke air valve 52 and the make contacts 97 momentarily complete a circuit to the coil 62 of the forward stroke air valve 42 to provide braking action on the piston 20. When the paddle member 12 reaches its home position the actuator arm 98 of the home position limit switch 94 dwells in the recessed portion 104 of the actuator member 102 so that the make contacts 97 are opened and the break contacts 92 are closed to again complete the circuit to the return stroke air valve coil 64, thus providing a holding force on the paddle member as it resides in its home position.

Although the limit switches 76 and 92 are shown in this embodiment mounted on the guide rail 16 over the conveyor belt and the actuator 102 is shown directly connected to the paddle member 12 it is to be understood that they may be positioned in any manner such that the actuator member describes the travel of the paddle member 12 and the limit switches are representative of the limits of travel thereof. For example, the actuator member 12 might be connected by some sort of extension arm to the piston shaft 22 and the limit switches rigidly supported in some manner away from the conveyor belt in applications where it is not desirable or necessary to provide the guide rails 16 for the paddle member.

While there has been a preferred embodiment described in the foregoing description and illustrated in the accompanying drawings, it is to be understood that many modifications may be made thereto while remaining within the spirit of the invention. It is, therefore, intended that the invention be limited only by the scope of the appended claims.

What is claimed is:

1. Apparatus for transferring an object to and from a moving conveyor, or the like, comprising a paddle member, means mounting said paddle member for movement transversely of said moving conveyor for engaging said object, an air cylinder, a piston within the cylinder and operatively connected to said paddle member, a pressurized air source, means for connecting said air source to each end of said cylinder, said connecting means including an electrically operable valve between each end of the cylinder and said air source, means operable responsive to an electric signal for energizing one of said valves to move said paddle member toward its extended position, a limit switch associated with the extended position of said paddle member, means adapted for movement with said paddle member for actuating said extended position limit switch as the paddle member approaches said position to simultaneously deenergize said one valve and energize the other valve to reverse the movement of said paddle member, a second limit switch associated with the home position of said paddle member, said actuating means adapted to actuate said second limit switch as the paddle member approaches its home position of said paddle member, said actuating means adapted to actuate said second limit switch as the paddle member approaches its home position to deenergize said other valve, and means including said second limit switch and said actuating means for reactuating said second valve when the paddle member reaches its home position to hold same in said position.

2. Apparatus for transferring an object to and from a moving conveyor, or the like, comprising a paddle member, means mounting said paddle member for movement transversely of said moving conveyor for engaging said object, an air cylinder, a piston within the cylinder and operatively connected to said paddle member, a pressurized air source, means for connecting said air source to each end of said cylinder, said connecting means including an electrically operable valve between each end of the cylinder and said air source, adjustable speed control means between each end of the cylinder and said air source, adjustable speed control means between each end of the cylinder and said air source, means operable responsive to an electric signal for energizing one of said valves to move said paddle member toward its extended position, a limit switch associated with the extended position of said paddle member, means adapted for movement with said paddle member for actuating said extended position limit switch as the paddle member approaches said position to simultaneously deenergize said one valve and energize the other valve to reverse the movement of said paddle member, a second limit switch associated with the home position of said paddle member, said actuating means adapted to actuate said second limit switch as the paddle member approaches its home position to deenergize said other valve, and means including said second limit switch and said actuating means for reactuating said second valve when the paddle member reaches its home position to hold same in said position.

3. Apparatus for transfering an object to and from a moving conveyor, or the like, comprising a paddle member, means mounting said paddle member for movement transversely of said moving conveyor for engaging said object, an air cylinder, a piston within the cylinder and operatively connected to said paddle member, a pressurized air source, means for connecting said air source to each end of said cylinder, said connecting means including an electrically operable valve between each end of the cylinder and said air source, a relay having a first set of contacts operable responsive to an electric signal to completing a circuit to one of said valves to move said paddle member toward its extended position, a limit switch associated with the extended position of said paddle member, means adapted for movement with said paddle member for actuating said extended position limit switch as the paddle member approaches said position to deenergize said relay, a second set of contacts operable responsive to the deenergization of said relay for completing a circuit to reverse the movement of said paddle member, a second limit switch associated with the home position of said member, said actuating means adapted to actuate said second limit switch as the paddle member approaches its home position to momentarily open the circuit to said other valve and stop said paddle member, said actuator means including means for releasing said second limit switch when the paddle member is in its home position to recomplete the circuit to said second valve.

4. The apparatus of claim 3 wherein said actuating means comprise a forward portion for actuating the extended position limit switch as the paddle member approaches said extended position, a rearward portion for actuating the home position limit switch as the paddle member approaches said home position, a dwell portion between said forward and rearward portions to enable said home position limit switch to release when the paddle member is in its home position, and means for preventing said dwell portion from releasing said extended position switch when the paddle member is at its extended position.

5. Apparatus for transfering an object to and from a moving conveyor, or the like, comprising a paddle member, means mounting said paddle member for movement transversely of said moving conveyor for engaging said object, an air cylinder, a piston within the cylinder and operatively connected to said paddle member, a pressurized air source for connecting said air source to one end of said cylinder for driving said paddle member to an extended position and for connecting the air source to the other end of said cylinder for retracting the paddle member to its home position, said connecting means including one electrically operable valve between said one end of the cylinder and said air source and another electrically operable valve between the other end of the cylinder and the air source, a relay having a set of normally open contacts in a circuit for energizing said one valve and a set of normally closed contacts completing a circuit for said other valve, said relay being operable responsive to a predetermined electric signal to energize said one valve and deenergize said other valve to move said paddle toward its extended position, a limit switch associated with the extended position of said paddle member, means adapted for movement with said paddle member for actuating said extended position limit switch as the paddle member approaches said position to deenergize said relay and energize said other valve while deenergizing said one valve to reverse the movement of said paddle member, a second limit switch having make and break contacts associated with the home position of said paddle member, said actuating means adapted to actuate said second limit switch as the paddle member approaches its home position to momentarily open the circuit to said other valve and close the circuit to said first valve thereby stopping said paddle member, said actuator means including means for releasing said second limit switch when the paddle member is in its home position to recomplete the circuit to said other valve and open the circuit to said first valve.

6. The apparatus of claim 5 wherein said actuating means comprise a forward portion for actuating the extended position limit switch as the paddle member approaches said extended position, a rearward portion for actuating the home position limit switch as the paddle member approaches said home position, a dwell portion between said forward and rearward portions to enable said home position limit switch to release when the paddle member is in its home position, and means for preventing said dwell portion from releasing said extended position switch when the paddle member is at its extended position.

7. An actuator for limit switches associated with the home and extended positions, respectively, of an air operated paddle member, or the like, comprising a forward portion for actuating the extended position limit switch as the paddle member approaches said extended position, a rearward portion for actuating the home position limit switch as the paddle member approaches said home position, a dwell portion between said forward and rearward portions to enable said home position limit switch to release when the paddle member is in its home position, and means for preventing said dwell portion from releasing said extended position switch when the paddle member is at its extended position.

8. An actuator for limit switches associated with the home and extended positions, respectively, of an air operated paddle member, or the like, comprising a forward extending plate portion, a rearward extending plate portion coplanar and spaced from said first plate portion, a recessed portion between and interconnecting said plate portions, a third plate portion coplanar with and interconnecting said forward and rearward plate portions across a portion of said recessed portion, and means on said actuator for mounting same for movement with the paddle member to actuate the limit switches when engaging with said coplanar plate portions and to deactivate at least one of the switches when engaging said recessed portion.

References Cited in the file of this patent

UNITED STATES PATENTS

| | | |
|---|---|---|
| 2,695,123 | Suellentrop | Nov. 23, 1954 |
| 2,758,728 | Henry | Aug. 14, 1956 |
| 3,026,988 | Fisk | Mar. 27, 1962 |